United States Patent
Nakajima

(10) Patent No.: US 8,452,238 B2
(45) Date of Patent: May 28, 2013

(54) RADIO TRANSMISSION DEVICE, METHOD FOR DETERMINING MODULATION SYSTEM, AND RECORDING MEDIUM THEREFOR

(75) Inventor: Hiroaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 412 days.

(21) Appl. No.: 12/811,498

(22) PCT Filed: Jan. 16, 2009

(86) PCT No.: PCT/JP2009/051018
§ 371 (c)(1),
(2), (4) Date: Jul. 1, 2010

(87) PCT Pub. No.: WO2009/093670
PCT Pub. Date: Jul. 30, 2009

(65) Prior Publication Data
US 2010/0297949 A1    Nov. 25, 2010

(30) Foreign Application Priority Data

Jan. 24, 2008   (JP) .................................. 2008-013584

(51) Int. Cl.
*H04B 1/00*       (2006.01)
(52) U.S. Cl.
USPC ................... 455/63.1; 455/67.11; 455/67.13; 455/522; 455/69; 455/114.2; 455/103; 455/550.1; 370/252; 370/260; 370/204; 370/206; 370/242; 370/335; 375/260; 375/265; 375/269

(58) Field of Classification Search
USPC ........... 455/63.1, 522, 69, 13.4, 550.1, 67.11, 455/67.13, 103, 114.2; 370/335, 342, 477, 370/252
See application file for complete search history.

(56) References Cited

U.S. PATENT DOCUMENTS 7,414,964 B2 * 8/2008 Hashem et al. ............... 370/208
(Continued)

FOREIGN PATENT DOCUMENTS

| JP | 57-159148 A | 10/1982 |
| JP | 2005236709 A | 9/2005 |

(Continued)

OTHER PUBLICATIONS

International Search Report for PCT/JP2009/051018 mailed Feb. 17, 2009.

*Primary Examiner* — Marceau Milord

(57) ABSTRACT

A problem that a loss of signal occurs due to switching of a modulation scheme using an adaptive modulation scheme is solved. A radio transmission device (10a, 10b) having an automatic transmission power control function of controlling transmission power of its own station so as to maintain received power of a counter station at a preset constant value and a function of an adaptive modulation scheme for automatically switching over a modulation scheme depending on quality of a radio transmission path includes a modulation scheme determining circuit (14a, 14b) for switching over the modulation scheme by using the adaptive modulation scheme in consideration of a transmission power margin and the received power.

18 Claims, 6 Drawing Sheets

U.S. PATENT DOCUMENTS

| | | | |
|---|---|---|---|
| 7,792,495 B2 * | 9/2010 | Oshima et al. | 455/69 |
| 7,801,236 B2 * | 9/2010 | Tamaki et al. | 375/267 |
| 7,961,800 B2 * | 6/2011 | Yoshida | 375/260 |
| 8,149,727 B2 * | 4/2012 | Futagi et al. | 370/252 |
| 8,208,363 B2 * | 6/2012 | Kishiyama et al. | 370/204 |
| 8,249,179 B2 * | 8/2012 | Onodera et al. | 375/260 |
| 2008/0051129 A1 * | 2/2008 | Abe et al. | 455/550.1 |
| 2009/0296852 A1 * | 12/2009 | Kobayashi | 375/295 |
| 2010/0260251 A1 * | 10/2010 | Yokomakura et al. | 375/232 |

FOREIGN PATENT DOCUMENTS

| | | |
|---|---|---|
| JP | 2007214819 A | 8/2007 |
| JP | 2007243938 A | 9/2007 |
| WO | 2007138706 A | 12/2007 |

* cited by examiner

RADIO TRANSMISSION DEVICE, METHOD FOR DETERMINING MODULATION SYSTEM, AND RECORDING MEDIUM THEREFOR

TECHNICAL FIELD

This invention relates to a radio transmission device having an automatic transmission power control function (automatic transmitter power control (ATPC)) of controlling transmission power of its own station so as to maintain received power of a counter station at a preset constant value and a function of an adaptive modulation scheme for automatically switching over a modulation scheme depending on quality of a radio transmission path.

BACKGROUND ART

Signal transmission quality of a radio communication system depends on a situation of a radio transmission path. Therefore, received power during a normal operation is set higher than the received power of which minimum quality can be secured. As a result, a fluctuation immunity in the radio transmission path is small in a normal state. However, in the normal state, a modulation scheme of more multiple levels can be selected, which can enhance a transmission capacity.

Meanwhile, even in a state in which the quality of the radio transmission path is low, an instantaneous interruption of a radio channel can be avoided by employing a modulation scheme (of a small number of multiple levels) exhibiting a large fluctuation immunity in the radio transmission path. However, if the modulation scheme exhibiting a large fluctuation immunity in the radio transmission path is employed, the transmission capacity is reduced. Such a scheme for changing the modulation scheme depending on the situation of the transmission path is called "adaptive modulation scheme" in this technical field. By employing the adaptive modulation scheme, it is possible to maximize the transmission capacity while securing the minimum transmission capacity.

That is, the adaptive modulation scheme represents a function of maximizing the transmission capacity while securing the minimum transmission capacity depending on the quality of the radio transmission path. To be described in detail, in the adaptive modulation scheme, if the quality of the radio transmission path is degraded, the modulation scheme is automatically switched over from the modulation scheme (of a large number of multiple levels; hereinafter, referred to as "modulation scheme A") exhibiting a small fluctuation immunity in the radio transmission path but a large transmission capacity thereof to the modulation scheme (of a small number of multiple levels; hereinafter, referred to as "modulation scheme B") exhibiting a large fluctuation immunity in the radio transmission path but a small transmission capacity thereof. Thereby, the transmission capacity is reduced, but a probability of occurrence of an interruption of the radio channel or a signal error is lowered. In contrast, if the quality of the radio transmission path is improved, the modulation scheme is automatically switched over from the modulation scheme B to the modulation scheme A to thereby enhance the transmission capacity. Examples of a technology related to this adaptive modulation scheme include one described in JP 57-159148 A (hereinafter, referred to as "Patent Document 1"). Patent Document 1 discloses examples of phase shift keying (PSK) modulation schemes of two phases, four phases, eight phases, sixteen phases, and the like as examples of the modulation scheme.

In a radio communication device using the above-mentioned adaptive modulation scheme, a multi-level modulation scheme higher in frequency use efficiency is used in a case where the quality of the transmission path is high as in good weather and received power high enough can be secured. Meanwhile, in a case where the quality of the transmission path is low as in rainy weather and the quality of a transmission signal is degraded in the multi-level modulation scheme, the radio communication device using the above-mentioned adaptive modulation scheme is switched over to the modulation scheme (of a small number of multiple levels) which exhibits a larger difference between transmission power and the minimum received power of which minimum quality can be maintained (and which exhibits a high system gain).

As described above, in the adaptive modulation scheme, irrespective of the quality of the transmission path, it is possible to achieve an increase in the transmission capacity under normal operating conditions while securing signal transmission higher in priority. At present, the increase in the transmission capacity is demanded from the radio transmission device as an infrastructure of a mobile communication system. As an implementation measure, the adaptive modulation scheme has been becoming important.

The adaptive modulation scheme as described in Patent Document 1 is applied to a burst transmission scheme representing transmission of discontinuous signals. The transmission power in the burst transmission scheme is determined for each modulation scheme corresponding to each burst signal, and hence the quality of the radio transmission path can be judged only based on the received power.

However, in a case where the adaptive modulation scheme for performing switching judgment only based on the received power is applied to the radio transmission device for transmitting/receiving continuous signals, if an instantaneous interruption in the received power occurs due to fading or the like, the modulation scheme is erroneously switched over, leading to a problem that a loss of signal occurs due to the switching.

In addition, in a case where the received power constantly fluctuates with the unstable quality of the radio transmission path, the modulation schemes are continuously switched over to each other, which leads to a problem that continuous losses of signal occur accordingly.

Meanwhile, in the radio communication system, an automatic transmission power control function (automatic transmitter power control (ATPC)) is used as a technology for reducing an interference amount with respect to another radio circuit by dropping the transmission power under normal operating conditions to as low a level as possible while maintaining the quality of the radio transmission path. In the case of using the ATPC, the transmission power is raised only when the received power becomes low due to the rainy weather or the like. Examples of a technology related to the ATPC include one described in JP 2005-236709 A (hereinafter, referred to as "Patent Document 2"). Patent Document 2 discloses examples of a super multi-level modulation schemes such as binary phase shift keying (BPSK), quadrature phase shift keying (QPSK), 16-quadrature amplitude modulation (QAM), 64-QAM, 256-QAM, or 1024-QAM as the modulation scheme.

In the radio communication system described in Patent Document 2 described above to which the ATPC is applied, optimization of the interference amount can be achieved, but the transmission capacity is constant. Therefore, the transmission capacity is determined by the modulation scheme assumed to be used when the situation of the transmission path is deteriorated.

As a measure of solving the problems as described above, a technology that combines the ATPC and the adaptive modulation scheme is described in JP 2007-214819 A (hereinafter, referred to as "Patent Document 3"). In Patent Document 3, the transmission scheme including the modulation scheme is determined. Patent Document 3 discloses that any one of: a modulation scheme such as BPSK, QPSK, 16-QAM, or 64-QAM; a coding scheme such as convolutional coding, turbo coding, or low density parity check code (LDPC) coding; a transmission scheme using a plurality of antennae such as space time coding (STC) or space division multiplexing (SDM); and the like is used as the transmission scheme.

Further, as described in Patent Document 3, the transmission power is constantly adjusted during its transmission in a case where the ATPC and the adaptive modulation scheme are combined to apply the adaptive modulation scheme to a radio transmission device provided with the ATPC for transmitting/receiving continuous signals. This leads to a problem that the following malfunction occurs when the modulation scheme is switched over only based on the received power.

That is, in the case of performing the switching judgment only based on the received power, when the quality of the radio transmission path is degraded to lower the received power, the modulation scheme is switched over even if the quality of the radio transmission path can be improved by transmission power adjustment using the ATPC, after which the original modulation scheme is regained when the received power is raised by the transmission power adjustment using the ATPC. Accordingly, even in a case of originally taking nothing more than a signal error due to the reduction in the received power, a loss of signal occurs due to the unnecessary switching of the modulation scheme.

DISCLOSURE OF THE INVENTION

An object of this invention is to provide a radio transmission device, a method of determining a modulation scheme, and a recording medium therefor which are capable of solving a problem that a loss of signal occurs due to switching of a modulation scheme using an adaptive modulation scheme.

According to this invention, there is provided a radio transmission device having an automatic transmission power control function of controlling transmission power of its own station so as to maintain received power of a counter station at a preset constant value and a function of an adaptive modulation scheme for automatically switching over a modulation scheme depending on quality of a radio transmission path, the radio transmission device including a modulation scheme determining circuit for switching over the modulation scheme by using the adaptive modulation scheme in consideration of a transmission power margin and the received power.

According to this invention, there is provided a method of determining a modulation scheme for a radio transmission device having an automatic transmission power control function of controlling transmission power of its own station so as to maintain received power of a counter station at a preset constant value and a function of an adaptive modulation scheme for automatically switching over a modulation scheme depending on quality of a radio transmission path, the method of determining a modulation scheme including switching over the modulation scheme by using the adaptive modulation scheme in consideration of a transmission power margin and the received power.

According to this invention, there is provided a recording medium having a program recorded thereon, the program being executed on a computer that implements a radio transmission device having an automatic transmission power control function of controlling transmission power of its own station so as to maintain received power of a counter station at a preset constant value and a function of an adaptive modulation scheme for automatically switching over a modulation scheme depending on quality of a radio transmission path, the program controlling the computer to execute a processing for switching over the modulation scheme by using the adaptive modulation scheme in consideration of a transmission power margin and the received power.

According to this invention, it is possible to prevent a loss of signal from occurring due to the unnecessary switching of the modulation scheme using the adaptive modulation scheme.

BEST MODE FOR EMBODYING THE INVENTION

Next, exemplary embodiments of this invention are described in detail with reference to the drawings.

First Exemplary Embodiment

Figure 1:
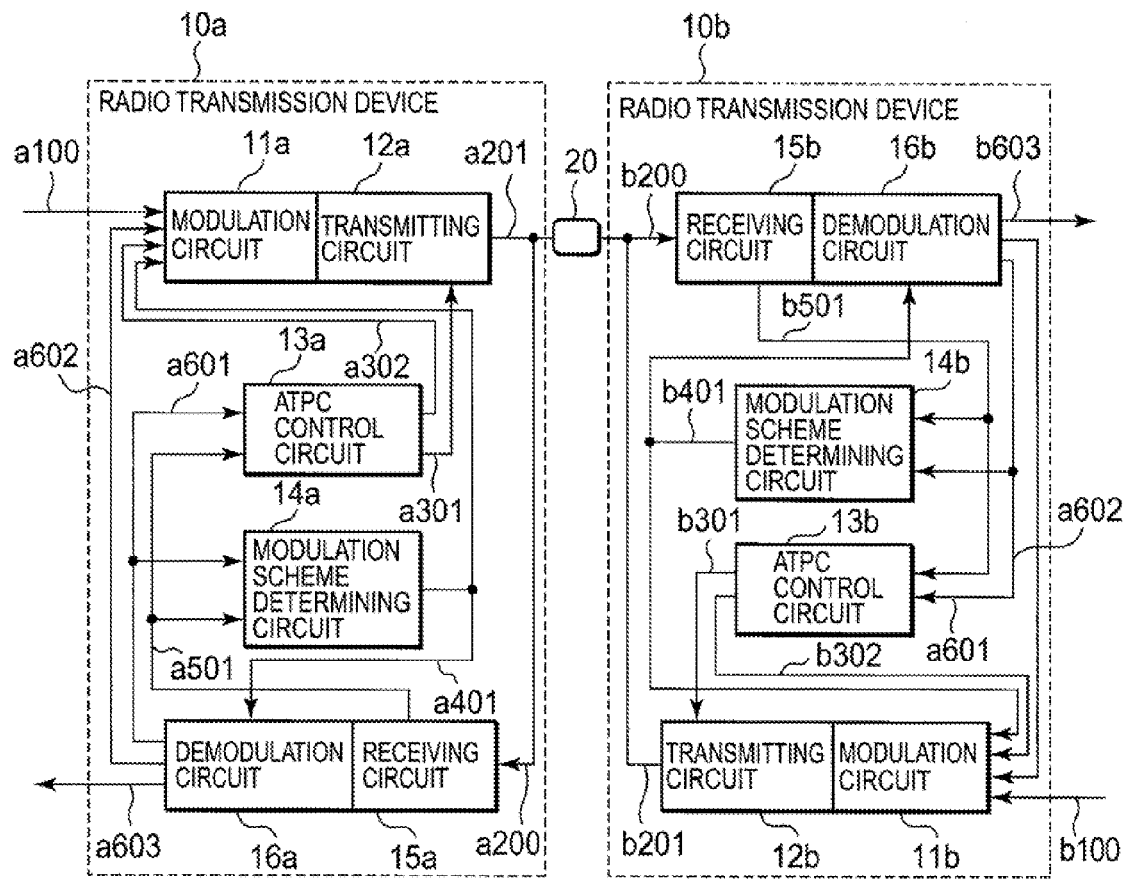
FIG. 1 is a block diagram illustrating a configuration of a radio transmission system including radio transmission devices according to a first exemplary embodiment of this invention.

Referring to FIG. 1, description is made of a configuration of a radio transmission device according to a first exemplary embodiment of this invention. FIG. 1 is a block diagram illustrating a radio transmission system including a first radio transmission device 10a and a second radio transmission device 10b connected to each other via a radio transmission path 20.

By referring to FIG. 1, the first radio transmission device 10a according to the first exemplary embodiment of this invention includes a first modulation circuit 11a, a first transmitting circuit 12a, a first ATPC control circuit 13a, a first modulation scheme determining circuit 14a, a first receiving circuit 15a, and a first demodulation circuit 16a. In the same manner, the second radio transmission device 10b according to the first exemplary embodiment of this invention includes a second modulation circuit 11b, a second transmitting circuit 12b, a second ATPC control circuit 13b, a second modulation scheme determining circuit 14b, a second receiving circuit 15b, and a second demodulation circuit 16b.

Note that the first radio transmission device 10a is called "own station", while the second radio transmission device 10b is called "counter station".

As described above, the first radio transmission device 10a and the second radio transmission device 10b of FIG. 1 have the same internal configuration, and hence the following description is made by referring to only the first radio transmission device 10a. That is, the components of the first radio transmission device are given the suffix "a", while the components of the second radio transmission device are given the suffix "b". Note that various signals used in the first radio transmission device are given the prefix "a", while various signals used in the second radio transmission device are given the prefix "b". In the following specification, symbols indicating signal names are parenthesized. Because the description is made by using the first radio transmission device 10a as a typical example, in the following description, the first radio transmission device 10a is referred to merely as "radio transmission device", and the word "first" is omitted from its internal components or the signals.

First, the modulation circuit 11a multiplexes a transmission main signal (a100) supplied from an external portion, an own station ATPC state signal (a302) supplied from the ATPC control circuit 13a, and a counter station modulation scheme control signal (a401) supplied from the modulation scheme determining circuit 14a. Then, the modulation circuit 11a modulates a carrier wave with the multiplexed signals by using a modulation scheme specified by an own station modulation scheme control signal (a602) supplied from the demodulation circuit 16a. The modulated wave produced by the modulation circuit 11a is a signal of an intermediate frequency.

The transmitting circuit 12a frequency-converts the signal (modulated wave) modulated by the modulation circuit 11a into a radio frequency. The transmitting circuit 11a transmits the frequency-converted radio signal as a transmission radio signal (a201) to the second radio transmission device 10b serving as the counter station. At this time, the transmitting circuit 12a controls transmission power of the transmission radio signal (a201) according to a transmission power control signal (a301) from the ATPC control circuit 13a.

The receiving circuit 15a receives a transmission radio signal (b201) transmitted from the second radio transmission device 10b as a received radio signal (a200). In this case, the receiving circuit 15a amplifies the received radio signal (a200) that has been attenuated by the radio transmission path 20. At the same time, the receiving circuit 15a sends the received power of the received radio signal (a200) as an own station received power monitor signal (a501) to both the ATPC control circuit 13a and the modulation scheme determining circuit 14a. Further, the receiving circuit 15a frequency-converts a signal frequency of the received radio signal (a200) from the radio frequency into the intermediate frequency. The receiving circuit 15a sends the frequency-converted received signal to the demodulation circuit 16a.

The demodulation circuit 16a demodulates the received signal by switching over the modulation scheme according to the counter station modulation scheme control signal (a401) supplied from the modulation scheme determining circuit 14a. Further, the demodulation circuit 16a separates the demodulated signal into a received main signal (a603), the own station modulation scheme control signal (a602), and a counter station ATPC state signal (a601). The counter station ATPC state signal (a601) stores the received power of the second radio transmission device 10b and a transmission power margin thereof. The demodulation circuit 16a sends the received main signal (a603) to a device (not shown) for processing the received main signal in the external portion. The demodulation circuit 16a sends the own station modulation scheme control signal (a602) to the modulation circuit 11a. Further, the demodulation circuit 16a sends the counter station ATPC state signal (a601) to the ATPC control circuit 13a and the modulation scheme determining circuit 14a.

The ATPC control circuit 13a has a function of controlling the transmission power of the own station so as to maintain received power of the counter station at a preset constant value (ATPC threshold value). The ATPC control circuit 13a separates the received power of the second radio transmission device 10b serving as the counter station from the counter station ATPC state signal (a601) supplied from the demodulation circuit 16a. Then, the ATPC control circuit 13a sends, to the transmitting circuit 12a, the transmission power control signal (a301) for performing ATPC control from a preset value based on the received power of the second radio transmission device 10b.

Further, the ATPC control circuit 13a receives the own station received power monitor signal (a501) supplied from the receiving circuit 15a. The ATPC control circuit 13a multiplexes the received power of the own station and a difference (transmission power margin) between the transmission power that can be transmitted and the current transmission power, and sends the multiplexed signals to the modulation circuit 11a as the own station ATPC state signal (a302).

The modulation scheme determining circuit 14a separates the transmission power margin of the second radio transmission device 10b from the counter station ATPC state signal (a601) supplied from the demodulation circuit 16a. Further, the modulation scheme determining circuit 14a detects the received power of the own station from the own station received power monitor signal (a501) supplied from the receiving circuit 15a. Then, the modulation scheme determining circuit 14a determines the modulation scheme from the transmission power margin of the counter station and the received power of the own station in such a manner as described later. Further, the modulation scheme determining circuit 14a sends the result of the determined modulation scheme to the modulation circuit 11a and the demodulation circuit 16a as the counter station modulation scheme control signal (a401).

Operation of the First Exemplary Embodiment

Referring to the block diagram illustrated in FIG. 1, description is made of an operation of the radio transmission device according to the first exemplary embodiment of this invention.

The modulation circuit 11a multiplexes the transmission main signal (a100) from the external portion, the own station ATPC state signal (a302) from the ATPC control circuit 13a which stores the received power of the own station and the transmission power margin of the own station, and the counter station modulation scheme control signal (a401)

from the modulation scheme determining circuit 14a to form a radio frame. The modulation circuit 11a modulates a carrier wave with the radio frame by using the modulation scheme according to the own station modulation scheme control signal (a602) from the demodulation circuit 16a.

The modulated radio frame (modulated wave) is frequency-converted into a radio frequency by the transmitting circuit 12a, and is transmitted thereby to the second radio transmission device 10b as the transmission radio signal (a201). The second radio transmission device 10b receives the transmission radio signal (a201) as a received radio signal (b200). The transmission power of the transmission radio signal (a201) at this time is controlled according to a transmission power control signal (a301) from the ATPC control circuit 13a.

Meanwhile, the receiving circuit 15a receives the transmission radio signal (b201) transmitted from the second radio transmission device 10b as the received radio signal (a200). The receiving circuit 15a amplifies the received radio signal (a200) that has been attenuated by the radio transmission path 20. At the same time, the receiving circuit 15a sends the received power of the received radio signal (a200) as the own station received power monitor signal (a501) to both the ATPC control circuit 13a and the modulation scheme determining circuit 14a. Further, the receiving circuit 15a frequency-converts the signal frequency of the received radio signal (a200) from the radio frequency into the intermediate frequency, and sends the frequency-converted received signal to the demodulation circuit 16a.

Subsequently, the demodulation circuit 16a demodulates the received signal by using the modulation scheme according to the counter station modulation scheme control signal (a401) from the modulation scheme determining circuit 14a.

Further, the demodulation circuit 16a separates the demodulated signal into the received main signal (a603), the own station modulation scheme control signal (a602), and the counter station ATPC state signal (a601). The counter station ATPC state signal (a601) stores the received power of the second radio transmission device 10b and the transmission power margin thereof. The demodulation circuit 16a sends the received main signal (a603) to the external portion, sends the own station modulation scheme control signal (a602) to the modulation circuit 11a, and sends the counter station ATPC state signal (a601) to the ATPC control circuit 13a and to the modulation scheme determining circuit 14a.

The ATPC control circuit 13a separates the received power of the second radio transmission device 10b from the counter station ATPC state signal (a601) from the demodulation circuit 16a. The ATPC control circuit 13a sends, to the transmitting circuit 12a, the transmission power control signal (a301) for performing such control as to raise the transmission power of the own station if the received power of the second radio transmission device 10b is smaller than the preset value. On the other hand, the ATPC control circuit 13a sends, to the transmitting circuit 12a, the transmission power control signal (a301) for performing such control as to lower the transmission power of the own station if the received power of the second radio transmission device 10b is larger than the preset value.

Further, the ATPC control circuit 13a receives the own station received power monitor signal (a501) from the receiving circuit 15a. The ATPC control circuit 13a multiplexes the received power of the own station and the difference (transmission power margin) between the transmission power that can be transmitted and the current transmission power, and sends the multiplexed signal to the modulation circuit 11a as the own station ATPC state signal (a302).

The modulation scheme determining circuit 14a separates the transmission power margin of the second radio transmission device 10b from the counter station ATPC state signal (a601) from the demodulation circuit 16a, and detects the received power of the own station from the own station received power monitor signal (a501) from the receiving circuit 15a.

Then, the modulation scheme determining circuit 14a determines an optimum modulation scheme by a determination method described later based on the transmission power margin of the counter station and the received power of the own station, and sends the result of the determination to the modulation circuit 11a and to the demodulation circuit 16a as the counter station modulation scheme control signal (a401).

Figure 2:
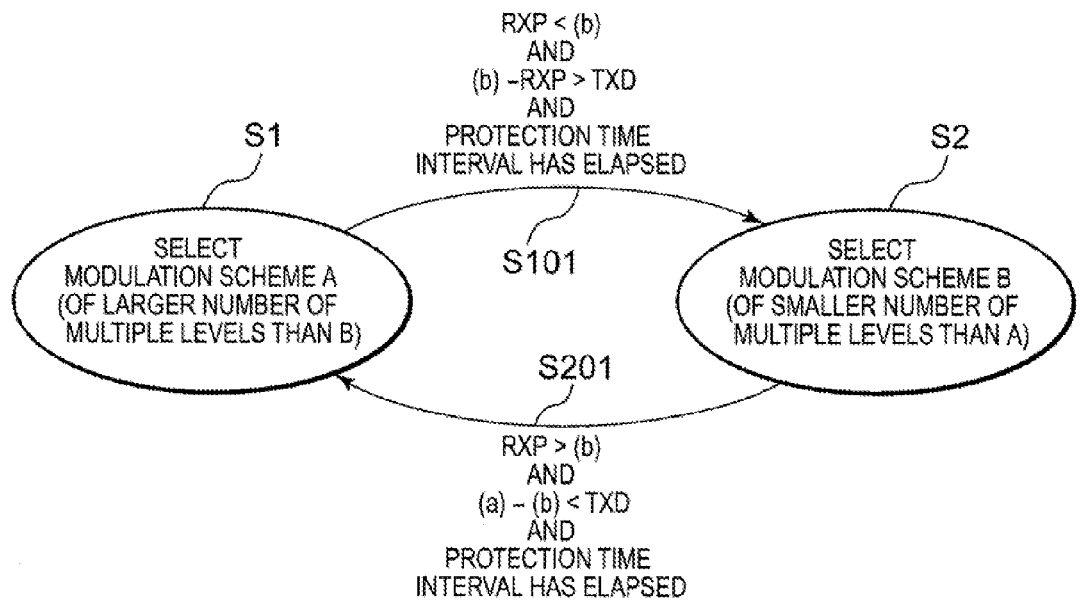
FIG. 2 is a diagram illustrating a state transition in which a modulation scheme is determined by a modulation scheme determining circuit of the radio transmission device according to the first exemplary embodiment of this invention.
Figure 3:
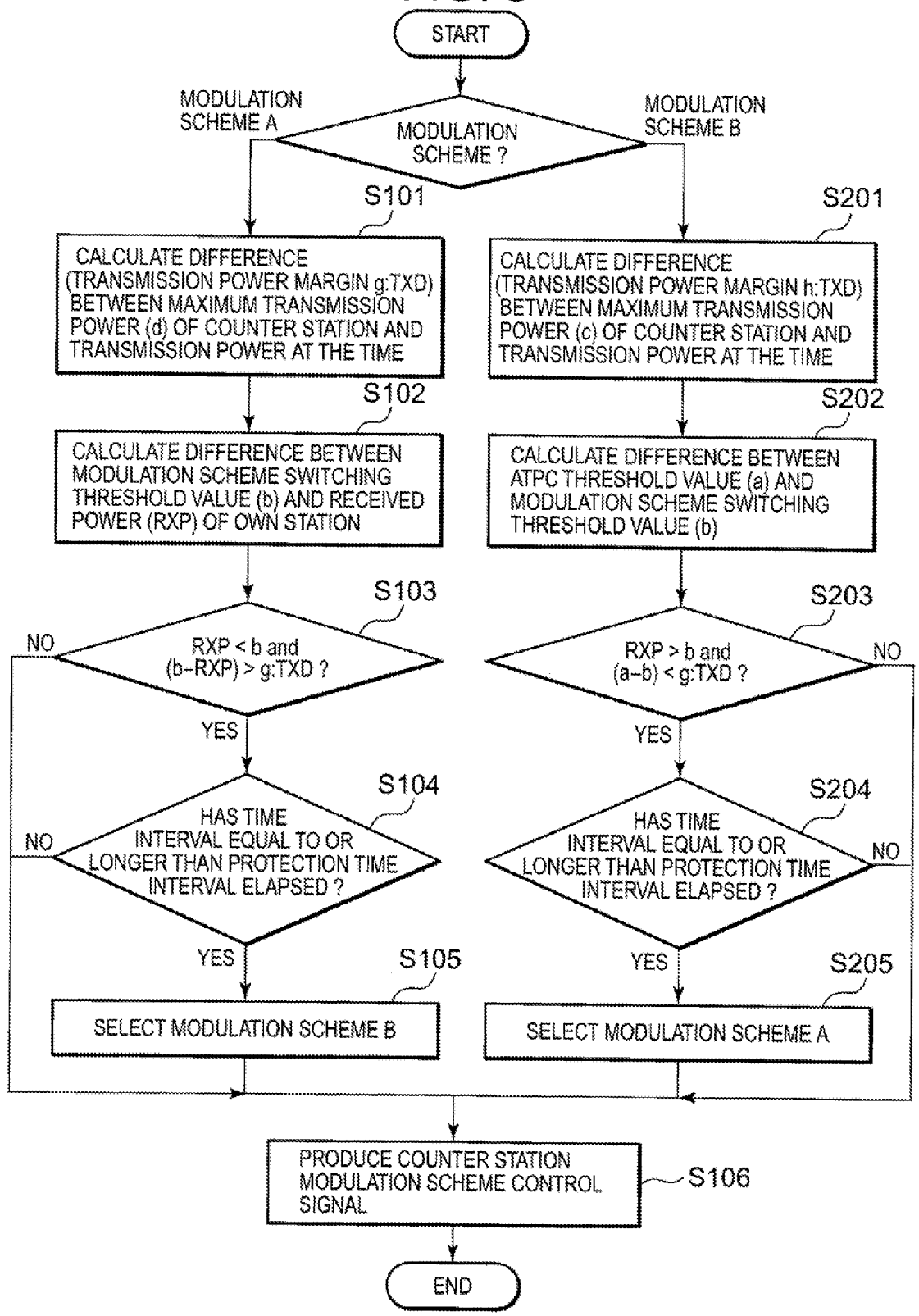
FIG. 3 is a flowchart illustrating a processing for determining the modulation scheme which is performed by the modulation scheme determining circuit of the radio transmission device according to the first exemplary embodiment of this invention.
Figure 4:
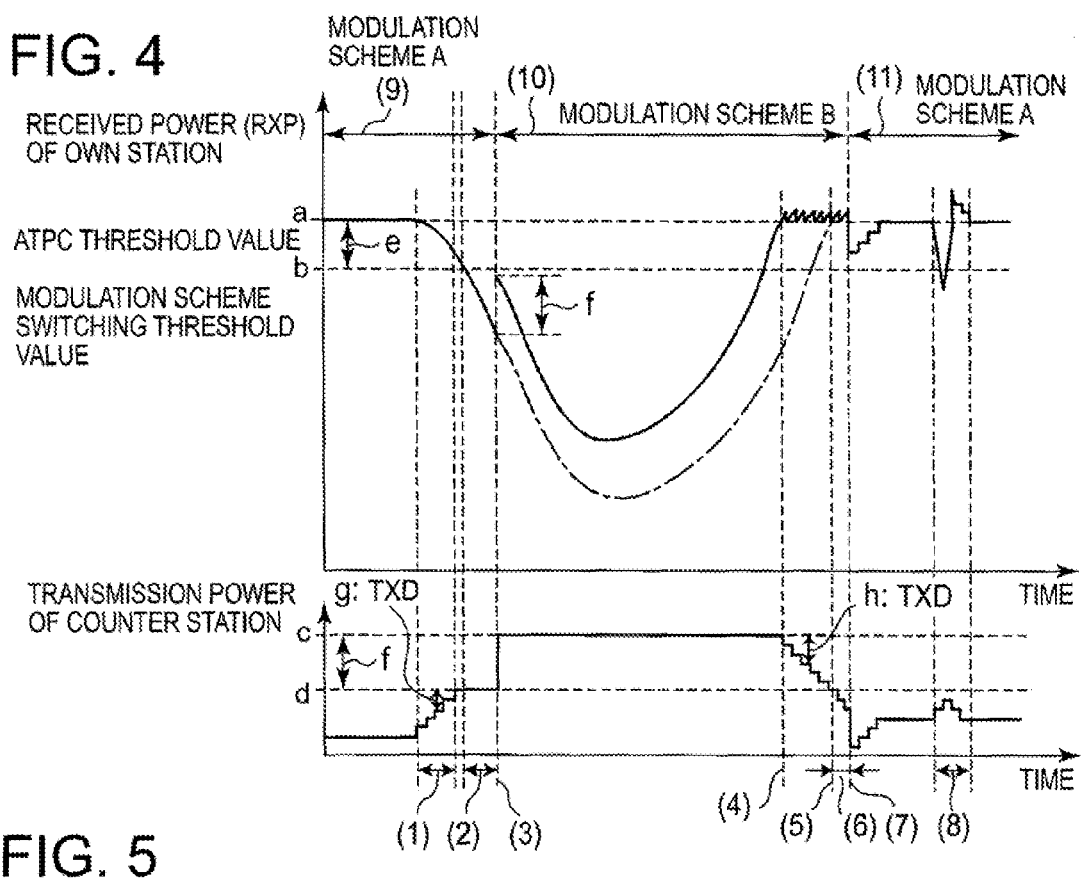
FIG. 4 is a diagram illustrating examples of received power of an own station in a modulation scheme A and a modulation scheme B and transmission power of a counter station in the modulation scheme A and the modulation scheme B according to the first embodiment of this invention.

Next, referring to FIGS. 2, 3, and 4, description will proceed to a method of determining the modulation scheme which is performed by the modulation scheme determining circuit 14a. FIG. 2 is a diagram illustrating a state transition in which the modulation scheme is determined by the modulation scheme determining circuit 14a. FIG. 3 is a flowchart for describing a processing for determining the modulation scheme which is performed by the modulation scheme determining circuit 14a. FIG. 4 is a diagram illustrating examples of the received power of the own station (first radio transmission device 10a) in a modulation scheme A and a modulation scheme B and the transmission power of the counter station (second radio transmission device 10b) in the modulation scheme A and the modulation scheme B. The modulation scheme A is called "first modulation scheme" while the modulation scheme B is called "second modulation scheme".

In the illustrated first exemplary embodiment, 16-QAM, for example, is used as the modulation scheme A (first modulation scheme), and QPSK, for example, is used as the modulation scheme B (second modulation scheme). However, it is natural that the modulation scheme A (first modulation scheme) and the modulation scheme B (second modulation scheme) are not limited to those modulation schemes.

The modulation scheme determining circuit 14a determines the modulation scheme according to the state transition illustrated in FIG. 2.

It is assumed that the current modulation scheme being used by the radio transmission device 10a is the modulation scheme A (of a large number of multiple levels) exhibiting a small fluctuation immunity in the radio transmission path but a large transmission capacity thereof. In this case (State S1 of FIG. 2), the modulation scheme determining circuit 14a determines the modulation scheme in the following manner.

The modulation scheme determining circuit 14a first calculates a difference (transmission power margin) (g:TXD of FIG. 4) between a maximum transmission power (d of FIG. 4) in the modulation scheme A of the counter station extracted from the counter station ATPC state signal (a601) from the demodulation circuit 16a and the transmission power at the time (Step 101).

Subsequently, the modulation scheme determining circuit 14a calculates a difference between the received power of the own station (RXP of FIG. 4) detected from the own station received power monitor signal (a501) from the receiving circuit 15a and a preset modulation scheme switching threshold value illustrated in FIG. 4 (b of FIG. 4) (Step S102).

Then, the modulation scheme determining circuit 14a judges whether or not the received power (RXP of FIG. 4) of the own station is smaller than the modulation scheme switching threshold value (b) and a difference between the modulation scheme switching threshold value (b) and the received power (RXP) of the own station is larger than the transmission power margin (g:TXD of FIG. 4) of the counter station (Step S103).

It is assumed that the received power (RXP) of the own station is smaller than the modulation scheme switching threshold value (b) and that the difference between the modulation scheme switching threshold value (b) and the received power (RXP) of the own station is larger than the transmission power margin (g:TXD) of the counter station (YES in Step S103). In this case, the modulation scheme determining circuit 14a judges whether or not the state has continued for a time equal to or longer than a preset protection time interval (Step S104).

If the state has continued for the time interval equal to or longer than the protection time interval (YES in Step S104), the modulation scheme determining circuit 14a selects the modulation scheme B as the modulation scheme (Step S105), and produces the counter station modulation scheme control signal (a401) (Step S106).

If the judgment results in NO in Step S103 or S104, the modulation scheme determining circuit 14a maintains the current modulation scheme, and does not perform the switching to the modulation scheme B.

Alternatively, it is assumed that the current modulation scheme being used by the radio transmission device 10a is the modulation scheme B (of a small number of multiple levels) exhibiting a large fluctuation immunity in the radio transmission path but a small transmission capacity thereof. In this case (State S2 of FIG. 2), the modulation scheme determining circuit 14a determines the modulation scheme in the following manner.

The modulation scheme determining circuit 14a first calculates a difference (transmission power margin) (h:TXD of FIG. 4) between a maximum transmission power (c of FIG. 4) in the modulation scheme B of the counter station extracted from the counter station ATPC state signal (a601) from the demodulation circuit 16a and the transmission power at the time (Step S201).

Subsequently, the modulation scheme determining circuit 14a calculates a difference (e) between the ATPC threshold value (a of FIG. 4) and the preset modulation scheme switching threshold value (b of FIG. 4) illustrated in FIG. 4 (Step S202).

Then, the modulation scheme determining circuit 14a judges whether or not the received power (RXP) of the own station is larger than the preset modulation scheme switching threshold value (b) and the difference (transmission power margin: h:TXD) between the maximum transmission power (c) in the modulation scheme B of the counter station and the transmission power at the time is larger than a difference between the ATPC threshold value (a) and the modulation scheme switching threshold value (b) (Step S203).

It is assumed that the received power (RXP) of the own station is larger than the preset modulation scheme switching threshold value (b) and that the difference (transmission power margin: h:TXD) between the maximum transmission power (c) in the modulation scheme B of the counter station and the transmission power at the time is larger than the difference between the ATPC threshold value (a) and the modulation scheme switching threshold value (b) (YES in Step S203). In this case, the modulation scheme determining circuit 14a judges whether or not the state has continued for the time equal to or longer than the preset protection time interval (Step S204).

If the state has continued for the time interval equal to or longer than the protection time interval (YES in Step S204), the modulation scheme determining circuit 14a selects the modulation scheme A as the modulation scheme (Step S205), and produces the counter station modulation scheme control signal (a401) (Step S106).

If the judgment results in NO in Step S203 or S204, the modulation scheme determining circuit 14a maintains the current modulation scheme, and does not perform the switching to the modulation scheme A.

A protection time interval serving as a condition for switching over from the modulation scheme A to the modulation scheme B and a protection time interval serving as a condition for switching over from the modulation scheme B to the modulation scheme A are set to have a separate length different from each other.

As described above, based on the counter station modulation scheme control signal (a401) produced by the modulation scheme determining circuit 14a, the modulation scheme of the demodulation circuit 16a of the own station and the modulation circuit 11b of the counter station illustrated in FIG. 1 is switched over to the modulation scheme A or the modulation scheme B.

Accordingly, in the radio transmission device provided with the ATPC and with the adaptive modulation scheme, it is possible to determine the modulation scheme in the adaptive modulation scheme by using the transmission power margin of the counter station and the received power of the own station.

Referring to FIG. 4, description is made of an example of a temporal change in the modulation scheme switching according to the first exemplary embodiment.

In FIG. 4, the abscissa axis represents the time, the ordinate axis of the upper graph represents the received power of the own station, and the ordinance axis of the lower graph represents the transmission power of the counter station.

First, at the initial stage of a period (9), the received power (RXP) is larger than the modulation scheme switching threshold value (b), and the quality of the radio transmission path 20 is satisfactory. Therefore, the modulation scheme determining circuit 14a selects the modulation scheme A (of a large number of multiple levels), and can secure the small fluctuation immunity in the radio transmission path 20 but the large transmission capacity thereof.

In a period (1), if the received power (RXP) becomes lower than the ATPC threshold value (a) due to rainy weather or the like, recovery of the received power is attempted by raising the transmission power of the counter station by the ATPC function. However, if the weather getting worse causes the received power (RXP) of the own station to be smaller than the modulation scheme switching threshold value (b) and the transmission power of the counter station to reach the maximum transmission power (d) in the modulation scheme A and if a state with the transmission power margin (g:TXD) being "0" has continued for the time interval equal to or longer than the preset protection time interval (period (2)), the modulation scheme determining circuit 14a judges that the quality of the radio transmission path 20 has been degraded, and a time instant (3), switches over the modulation scheme from the modulation scheme A to the modulation scheme B (period (10)).

At this time, if the received power sways around the modulation scheme switching threshold value (b) to prevent the above-mentioned condition from continuing for the time interval equal to or longer than the protection time interval (2), the switching of the modulation scheme is inhibited, which can prevent a loss of signal from occurring due to the switching.

The modulation scheme B exhibits the small transmission capacity because of the small number of multiple levels, but exhibits the large fluctuation immunity in the radio transmission path, which enables satisfactory radio transmission but even if the received power is lower than the modulation scheme A. Further, in general, the modulation scheme of a small number of multiple levels (modulation scheme B) exhibits a longer distance between signal points than the modulation scheme of a large number of multiple levels (modulation scheme A), and hence an immunity against signal distortion due to amplifiers within the transmitting circuit and the receiving circuit is large, which enables the transmission of larger power exhibiting more prominent distortion.

Therefore, at the time instant (3), the transmission power of the counter station is enhanced from the maximum transmission power (d) to the maximum transmission power (c), and, as illustrated in FIG. 4, the received power is accordingly enhanced by (f), which can improve the quality of the radio transmission path 20.

If the received power regains a level equal to or higher than the ATPC threshold value (a) owing to the recovery of the weather (at a time instant (4)), in the counter station, the ATPC operation is started, and the transmission power is lowered.

At a time instant (5), if the transmission power margin (h:TXD) is equal to or larger than the difference between the ATPC threshold value (a) and the modulation scheme switching threshold value (b) and if the state has continued for the time interval equal to or longer than a preset protection time interval (6), the modulation scheme determining circuit 14a judges at a time instant (7) that the quality of the radio transmission path 20 has been improved, and switches over the modulation scheme from the modulation scheme B (period (10)) to the modulation scheme A (period (11)). Therefore, it is possible to secure the small fluctuation immunity in the radio transmission path 20 but the large transmission capacity thereof.

At this time, for example, if the received power (RXP) sways around the ATPC threshold value (a) to prevent the above-mentioned condition from continuing for the time interval equal to or longer than the protection time interval (6), the switching of the modulation scheme is inhibited, which can prevent a loss of signal from occurring due to the switching.

As in a period (8), it is assumed that the received power (RXP) has dropped to a level equal to or lower than the modulation scheme switching threshold value instantaneously due to fading or the like. Even in this case, the transmission power margin (TXD) of the counter station is not "0" without the state continuing for the time interval equal to or longer than the protection time interval. This inhibits the switching from the modulation scheme A to the modulation scheme B and the subsequent switching from the modulation scheme B to the modulation scheme A, which can prevent a loss of signal from occurring due to the switching.

As described above, by using the received power of the own station and the transmission power margin of the counter station in the switching judgment for the modulation scheme, even if the received power becomes the level equal to or lower than the modulation scheme switching threshold value, it is possible to inhibit the switching of the modulation scheme when the received power can be recovered by the ATPC transmission power control, and to prevent a loss of signal from occurring due to the switching to a possible extent.

Further, by setting the protection time interval for the modulation scheme switching, it is possible to inhibit the intermittent switching of the modulation scheme due to the swaying of the received power or the instantaneous drop in the received power, and to effectively prevent a loss of signal from occurring due to the switching.

Note that each of kinds of parameter such as the ATPC threshold value, the modulation scheme switching threshold value, and the protection time interval can be changed by being set from the external portion and can be set to an optimum value according to a circuit design of the radio transmission path 20.

Further note that the first exemplary embodiment is described by using the two cases of the modulation schemes A and B as an example for simplifying the description, but may be applied to a case where three or more modulation schemes different in the number of multiple levels are combined with one another.

Effects of the First Exemplary Embodiment

A first effect is that, in the radio transmission device having the ATPC for controlling the transmission power of the own station so as to maintain the received power of the counter station at the preset constant value and having the adaptive modulation scheme for transmitting continuous signals and automatically switching over the modulation scheme depending on the quality of the radio transmission path 20, even if the received power becomes lower than the modulation scheme switching threshold value, if the received power can be recovered to the level equal to or higher than the modulation scheme switching threshold value by the ATPC of the counter station, it is possible to inhibit the switching to the modulation scheme (of a small number of multiple levels; hereinafter, referred to as "modulation scheme B") exhibiting the large fluctuation immunity but the small transmission capacity, and to prevent an unnecessary loss of signal from occurring.

This is because, by receiving the difference (transmission power margin) between the maximum power that can be transmitted from the counter station and the current transmission power to thereby judge whether or not to switch the modulation scheme based on the transmission power of the counter station in addition to the received power detected by the own station, even if the received power becomes lower than the modulation scheme switching threshold value, the judgment is performed by judging whether or not the transmission power margin exists and whether or not the received power can be recovered to the level equal to or higher than the modulation scheme switching threshold value.

A second effect is that, if the received power is recovered to the level equal to or higher than the modulation scheme switching threshold value after the switching to the modulation scheme B because the quality of the radio transmission path 20 is degraded, by inhibiting the switching to the modulation scheme (of a large number of multiple levels; hereinafter, referred to as "modulation scheme A") exhibiting the small fluctuation immunity but the large transmission capacity until the quality of the radio transmission path 20 is stabilized, it is possible to prevent an interruption of the radio channel due to a quick change in the quality of the radio transmission path 20 after the switching to the modulation scheme B and to prevent flip-flopping due to the switching of the modulation scheme observed in a case where the quality of the radio transmission path 20 is unstable.

This is because, by receiving the transmission power margin and performing the switching judgment for the modulation scheme based on the transmission power margin of the counter station in addition to the received power detected by the own station, even if the received power becomes higher than the modulation scheme switching threshold value, the switching to the modulation scheme A is inhibited in a case where the transmission power margin of the counter station is below the difference between the ATPC threshold value and the modulation scheme switching threshold value or where a state with the transmission power margin having a level equal to or higher than the difference between the ATPC threshold value and the modulation scheme switching threshold value has not continued for the time interval equal to or longer than the preset protection time interval.

A third effect is that, in the radio transmission device, it is possible to inhibit the switching of the modulation scheme due to an instantaneous drop in the received power such as fading or the like, and to prevent a loss of signal from occurring due to the switching.

This is because the modulation scheme is not switched over unless a state in which the received power and the transmission power margin satisfy the condition for switching to the modulation scheme A continues for the time interval equal to or longer than the preset protection time interval in the switching judgment for the modulation scheme.

Second Exemplary Embodiment

In the first exemplary embodiment illustrated in FIG. 1, the modulation scheme between the transmission/reception is determined by the modulation scheme determining circuit of the radio transmission device on a receiving end. Meanwhile, a second exemplary embodiment illustrated in FIG. 5 is configured so that the modulation scheme between the transmission/reception can be determined also by the modulation scheme determining circuit of the radio transmission device on a transmitting end.

Figure 5:
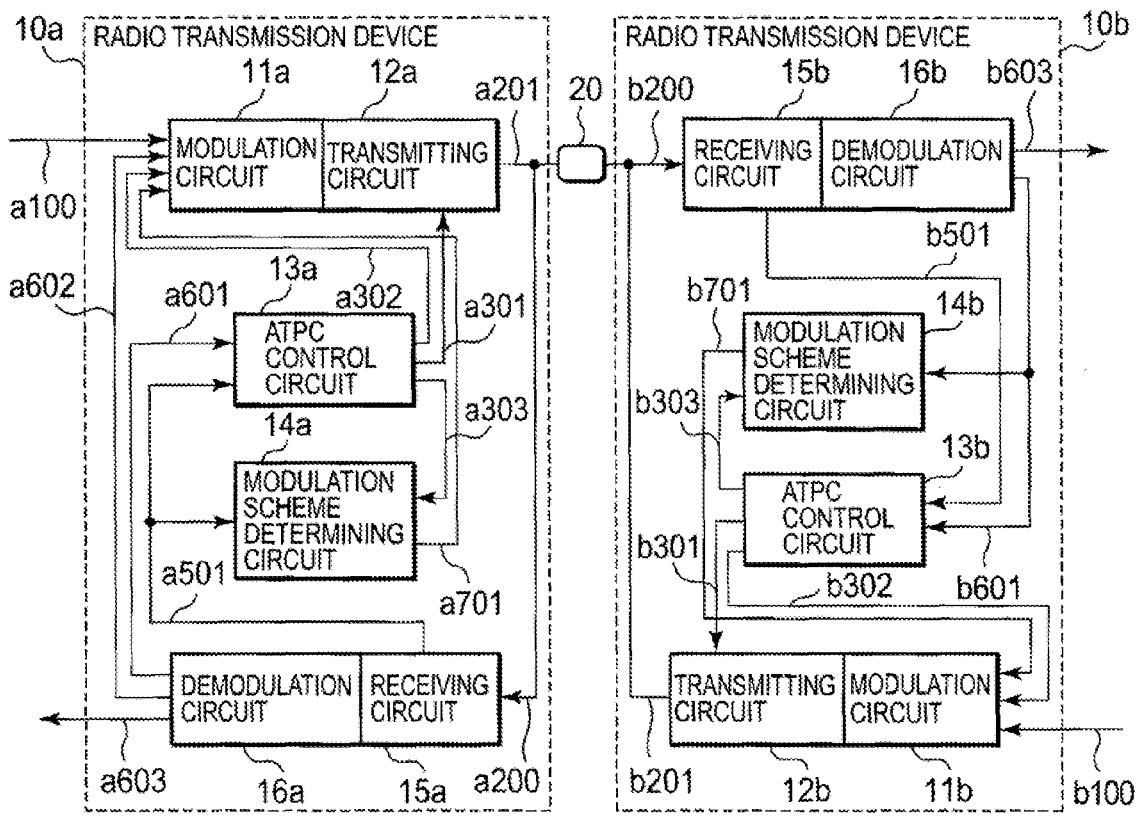
FIG. 5 is a block diagram illustrating a configuration of a radio transmission system including radio transmission devices according to a second exemplary embodiment of this invention.

Referring to FIG. 5, description is made of a configuration and an operation of a radio transmission device according to the second exemplary embodiment. FIG. 5 is a block diagram illustrating a radio transmission system including a first radio transmission device 10a and a second radio transmission device 10b connected to each other via a radio transmission path 20.

By referring to FIG. 5, the first radio transmission device 10a according to the exemplary second embodiment of this invention includes a first modulation circuit 11a, a first transmitting circuit 12a, a first ATPC control circuit 13a, a first modulation scheme determining circuit 14a, a first receiving circuit 15a, and a first demodulation circuit 16a. In the same manner, the second radio transmission device 10b according to the second exemplary embodiment of this invention includes a second modulation circuit 11b, a second transmitting circuit 12b, a second ATPC control circuit 13b, a second modulation scheme determining circuit 14b, a second receiving circuit 15b, and a second demodulation circuit 16b.

Note that the first radio transmission device 10a is called "own station", while the second radio transmission device 10b is called "counter station".

As described above, the first radio transmission device 10a and the second radio transmission device 10b of FIG. 1 have the same internal configuration, and hence the following description is made by referring to only the first radio transmission device 10a. That is, the components of the first radio transmission device are given the suffix "a", while the components of the second radio transmission device are given the suffix "b". Note that various signals used in the first radio transmission device are given the prefix "a", while various signals used in the second radio transmission device are given the prefix "b". In the following specification, symbols indicating signal names are parenthesized. Because the description is made by using the first radio transmission device 10a as a typical example, in the following description, the first radio transmission device 10a is referred to merely as "radio transmission device", and the word "first" is omitted from its internal components or the signals.

The modulation circuit 11a multiplexes a transmission main signal (a100) from an external portion, an own station ATPC state signal (a302) supplied from the ATPC control circuit 13a, and an own station modulation scheme control signal (a701) supplied from the modulation scheme determining circuit 14a. The modulation circuit 11a modulates a carrier wave with the multiplexed signals by using a modulation scheme specified by the own station modulation scheme control signal (a701). The modulated wave produced by the modulation circuit 11a is a signal of an intermediate frequency.

The transmitting circuit 12a frequency-converts the modulated wave into a radio frequency and transmits the frequency-converted signal as a transmission radio signal (a201) to the second radio transmission device 10b. At this time, the transmitting circuit 12a controls transmission power of the transmission radio signal (a201) according to a transmission power control signal (a301) supplied from the ATPC control circuit 13a.

Note that after the second demodulation circuit 16b of the second radio transmission device 10b serving as the counter station receives the own station modulation scheme control signal (a701), the switching of the modulation scheme is performed by the first modulation circuit 11a of the first radio transmission device 10a and the second demodulation circuit 16b of the second radio transmission device 10b.

The receiving circuit 15a receives a transmission radio signal (b201) transmitted from the second radio transmission device 10b as a received radio signal (a200). The receiving circuit 15a amplifies the received radio signal (a200) that has been attenuated by the radio transmission path 20. The receiving circuit 15a sends the received power of the received radio signal (a200) as an own station received power monitor signal (a501) to the ATPC control circuit 13a. Further, the receiving circuit 15a frequency-converts a signal frequency of the received radio signal (a200) into the intermediate frequency. The receiving circuit 15a sends the frequency-converted received signal to the demodulation circuit 16a.

Subsequently, the demodulation circuit 16a demodulates the received signal. The demodulation circuit 16a separates the demodulated signal into a received main signal (a603) and a counter station ATPC state signal (a601). The counter station ATPC state signal (a601) stores the received power of the second radio transmission device 10b. The demodulation circuit 16a sends the received main signal (a603) to the external portion and sends the counter station ATPC state signal (a601) to the ATPC control circuit 13a and the modulation scheme determining circuit 14a.

Note that the demodulation circuit 16a separates, from the radio frame, an own station modulation scheme control signal (b701) from the second radio transmission device 10b serving as the counter station. The demodulation circuit 16a switches over the modulation scheme to a modulation scheme specified by the own station modulation scheme control signal (b701) to thereby perform the demodulation of the received signal.

The ATPC control circuit 13a separates the received power of the second radio transmission device 10b from the counter station ATPC state signal (a601) supplied from the demodulation circuit 16a. If the received power of the second radio transmission device 10b is smaller than a preset value, the ATPC control circuit 13a sends, to the transmitting circuit 12a, the transmission power control signal (a301) for performing such adjustment as to raise the transmission power of the own station. On the other hand, if the received power of the second radio transmission device 10*b* is larger than the preset value, the ATPC control circuit 13*a* sends, to the transmitting circuit 12*a*, the transmission power control signal (a301) for performing such adjustment as to lower the transmission power of the own station.

Further, the own station received power monitor signal (a501) is supplied from the receiving circuit 15*a* to the ATPC control circuit 13*a*. Then, the ATPC control circuit 13*a* sends the received power of the own station to the modulation circuit 11*a* as the own station ATPC state signal (a302). The ATPC control circuit 13*a* sends a transmission power margin signal (a303) to the modulation scheme determining circuit 14*a*.

The modulation scheme determining circuit 14*a* detects the received power of the second radio transmission device 10*b* by separating the received power from the counter station ATPC state signal (a601) supplied from the demodulation circuit 16*a*. Further, the transmission power margin signal (a303) is supplied from the ATPC control circuit 13*a* to the modulation scheme determining circuit 14*a*. The modulation scheme determining circuit 14*a* determines the modulation scheme in the state transition illustrated in FIG. 6 from the transmission power margin of the own station and the received power of the counter station, and sends the result to the modulation circuit 11*a* as the own station modulation scheme control signal (a701).

Figure 6:
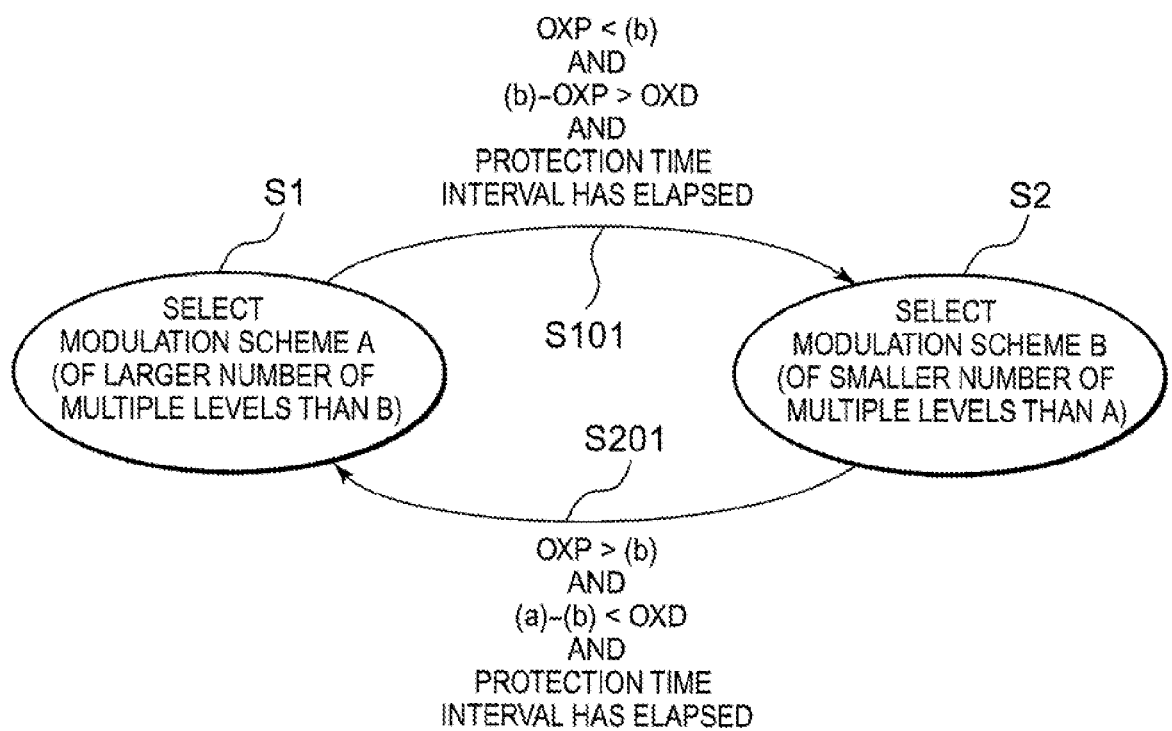
FIG. 6 is a diagram illustrating a state transition in which the modulation scheme is determined by a modulation scheme determining circuit of the radio transmission device according to the second exemplary embodiment of this invention.
Figure 7:
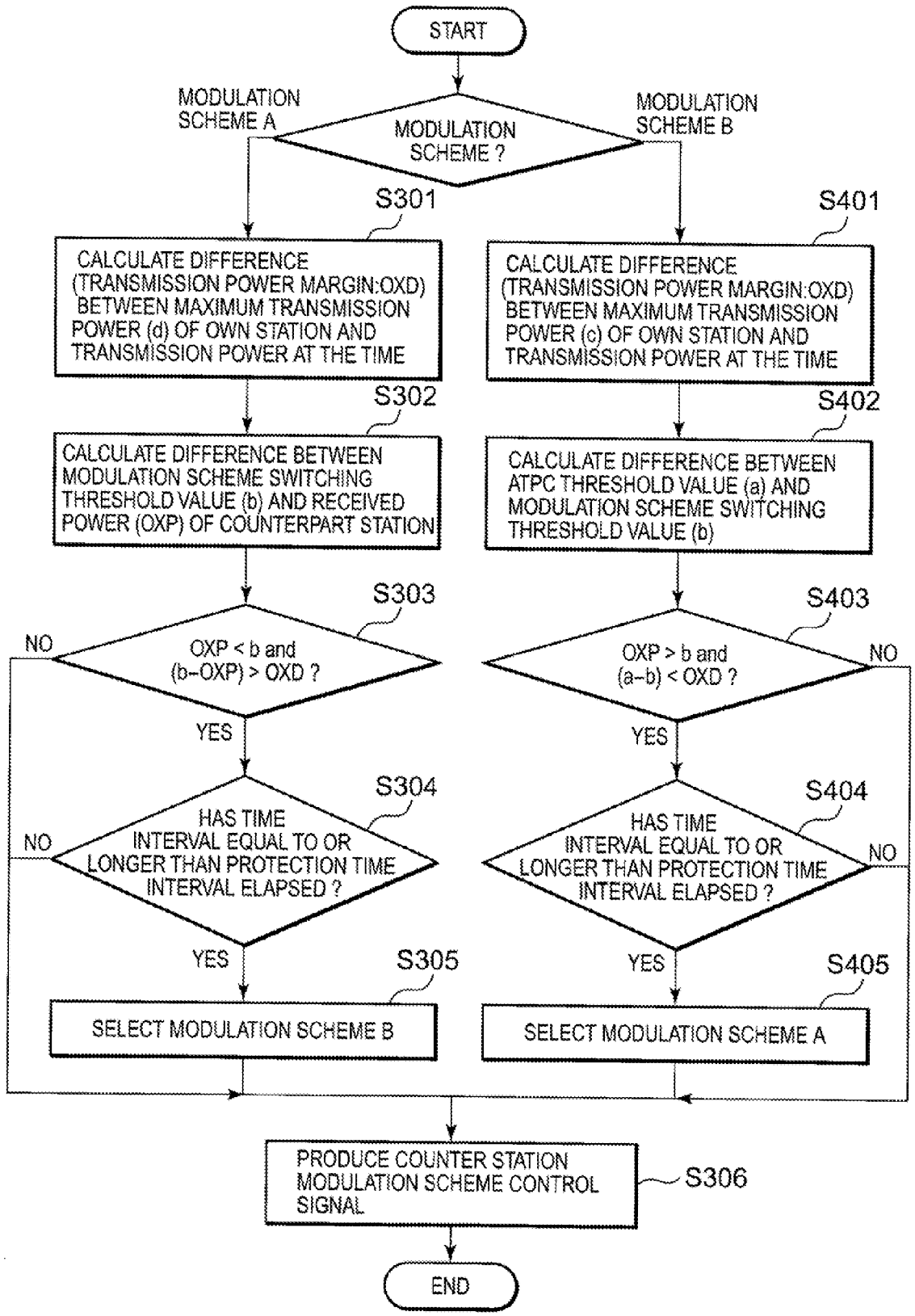
FIG. 7 is a flowchart illustrating a processing for determining the modulation scheme by the modulation scheme determining circuit of the radio transmission device according to the second exemplary embodiment of this invention.

Next, referring to FIGS. 6 and 7, description will proceed to a method of determining the modulation scheme which is performed by the modulation scheme determining circuit 14*a*. FIG. 6 is a diagram illustrating a state transition in which the modulation scheme is determined by the modulation scheme determining circuit 14*a*. FIG. 7 is a flowchart for describing a processing for determining the modulation scheme which is performed by the modulation scheme determining circuit 14*a*.

The modulation scheme determining circuit 14*a* determines the modulation scheme according to the state transition illustrated in FIG. 6. Note that, also in the illustrated second exemplary embodiment, 16-QAM, for example, is used as the modulation scheme A (first modulation scheme), and QPSK, for example, is used as the modulation scheme B (second modulation scheme). However, it is natural that the modulation scheme A (first modulation scheme) and the modulation scheme B (second modulation scheme) are not limited to those modulation schemes.

It is assumed that the current modulation scheme being used by the radio transmission device 10*a* is the modulation scheme A (of a large number of multiple levels) exhibiting a small fluctuation immunity in the radio transmission path but a large transmission capacity thereof. In this case (State S1 of FIG. 6), the modulation scheme determining circuit 14*a* determines the modulation scheme in the following manner.

The modulation scheme determining circuit 14*a* first calculates a difference (transmission power margin: OXD) between a maximum transmission power (c) in the modulation scheme A of the own station extracted from the own station ATPC state signal (a302) and the transmission power at the time (Step S301).

Subsequently, the modulation scheme determining circuit 14*a* calculates a difference between the received power (OXP) of the counter station detected from the counter station ATPC state signal (a601) from the receiving circuit 16*a* and a preset modulation scheme switching threshold value (b) (Step S302).

Then, the modulation scheme determining circuit 14*a* judges whether or not the received power (OXP) of the counter station is smaller than the modulation scheme switching threshold value (b) and a difference between the modulation scheme switching threshold value (b) and the received power (OXP) of the counter station is larger than the transmission power margin (OXD) of the own station (Step S303).

It is assumed that the received power (OXP) of the counter station is smaller than the modulation scheme switching threshold value (b) and that the difference between the modulation scheme switching threshold value (b) and the received power (OXP) of the counter station is larger than the transmission power margin (OXD) of the own station (YES in Step S303). In this case, the modulation scheme determining circuit 14*a* judges whether or not this state has continued for a time interval equal to or longer than a preset protection time interval (Step S304).

If the state has continued for the time interval equal to or longer than the protection time interval (YES in Step S304), the modulation scheme determining circuit 14*a* selects the modulation scheme B as the modulation scheme (Step S105), and produces the own station modulation scheme control signal (a701) (Step S106).

If the judgment results in NO in Step S303 or S304, the modulation scheme determining circuit 14*a* maintains the current modulation scheme, and does not perform the switching to the modulation scheme B.

Alternatively, it is assumed that the current modulation scheme being used by the radio transmission device (A) 10*a* is the modulation scheme B (of a small number of multiple levels) exhibiting a large fluctuation immunity in the radio transmission path but a small transmission capacity thereof. In this case (State S2 of FIG. 2), the modulation scheme determining circuit 14*a* determines the modulation scheme in the following manner.

The modulation scheme determining circuit 14*a* first calculates a difference (transmission power margin: OXD) between a maximum transmission power (c) in the modulation scheme B of the own station extracted from the own station ATPC state signal (a302) and the transmission power at the time (Step S401).

Subsequently, the modulation scheme determining circuit 14*a* calculates a difference between the ATPC threshold value (a) and the preset modulation scheme switching threshold value (b) (Step S402).

Then, the modulation scheme determining circuit 14*a* judges whether or not the received power (OXP) of the counter station is larger than the preset modulation scheme switching threshold value (b) and the difference (transmission power margin: OXD) between the maximum transmission power (c) in the modulation scheme B of the own station and the transmission power at the time is larger than a difference between the ATPC threshold value (a) and the modulation scheme switching threshold value (b) (Step S403).

It is assumed that the received power (OXP) of the counter station is larger than the preset modulation scheme switching threshold value (b) and that the difference (transmission power margin: OXD) between the maximum transmission power (c) in the modulation scheme B of the own station and the transmission power at the time is larger than the difference between the ATPC threshold value (a) and the modulation scheme switching threshold value (b) (YES in Step S403). In this case, the modulation scheme determining circuit 14*a* judges whether or not the state has continued for the time interval equal to or longer than the preset protection time interval (Step S404).

If the state has continued for the time interval equal to or longer than the protection time interval (YES in Step S404), the modulation scheme determining circuit 14*a* selects the modulation scheme A as the modulation scheme (Step S305), and produces the own station modulation scheme control signal (a701) (Step S306).

If the judgment results in NO in Step S403 or S404, the modulation scheme determining circuit 14a maintains the current modulation scheme, and does not perform the switching to the modulation scheme A.

A protection time interval serving as a condition for switching over from the modulation scheme A to the modulation scheme B and a protection time interval serving as a condition for switching over from the modulation scheme B to the modulation scheme A are set to have a separate length different from each other.

As described above, based on the own station modulation scheme control signal (a701) produced by the modulation scheme determining circuit 14a, the modulation scheme of the demodulation circuit 11a of the own station and the demodulation circuit 16b of the counter station illustrated in FIG. 5 is switched over to the modulation scheme A or the modulation scheme B.

Accordingly, in the radio transmission device provided with the ATPC and with the adaptive modulation scheme, it is possible to determine the modulation scheme in the adaptive modulation scheme by using the transmission power margin of the own station and the received the power of the counter station.

Effects of the Second Exemplary Embodiment

According to the second exemplary embodiment, the modulation scheme between the transmission/reception can be determined by the modulation scheme determining circuit on the transmitting end.

Figure 8:
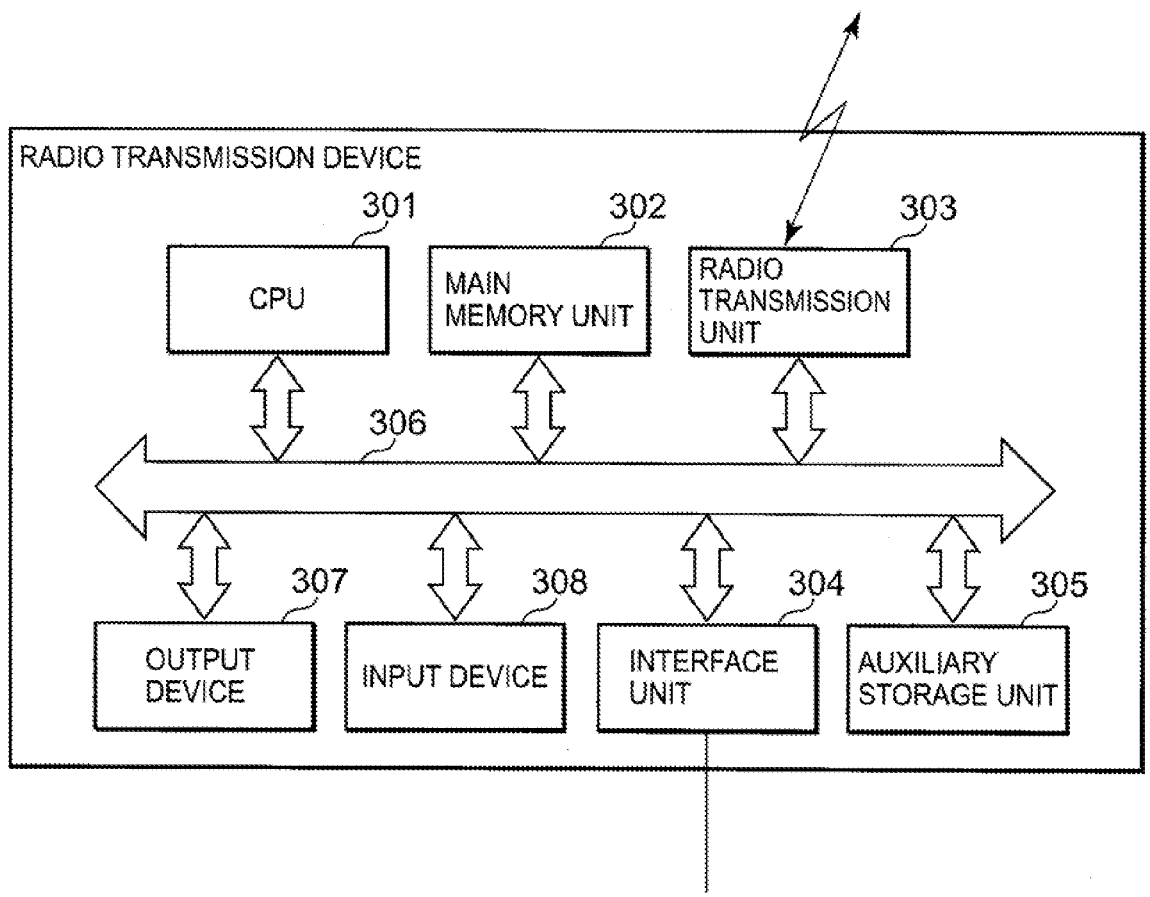
FIG. 8 is a block diagram illustrating a hardware configuration of the radio transmission device according to the exemplary embodiments of this invention.

Next, referring to FIG. 8, description is made of a hardware configuration of the radio transmission device according to the above-mentioned exemplary embodiments. FIG. 8 is a block diagram illustrating the hardware configuration of the radio transmission device.

By referring to FIG. 8, the radio transmission device can be realized by the same hardware configuration as that of a general computer device. The radio transmission device includes: a central processing unit (CPU) 301; a main memory unit 302 that is a main memory such as a random access memory (RAM) and is used as a work area for data or an area for temporarily saving data; a radio transmission unit 303 (corresponding to the modulation circuit 11a, the transmitting circuit 12a, the ATPC control circuit 13a, the modulation scheme determining circuit 14a, the receiving circuit 15a, and the demodulation circuit 16a) for executing a radio transmission processing under control of the CPU 301; an input/output interface unit 304; an auxiliary storage unit 305 that is a hard disk drive including a nonvolatile memory such as a read only memory (ROM), a magnetic disk, or a semiconductor memory; a system bus 306 for connecting the above-mentioned components to one another; an output device 307 such as a display device; and an input device 308 such as a keyboard.

In the radio transmission device according to these exemplary embodiments, it is natural to realize its operation in a hardware sense by packaging circuit parts that are hardware parts such as a large scale integration (LSI) in which a program for executing the transmission processing including the ATPC control and the processing for determining the modulation scheme is built, and it is also possible to realize the operation in a software sense by storing a program for providing each function of the above-mentioned radio transmission unit 303 (modulation circuit 11a, transmitting circuit 12a, ATPC control circuit 13a, modulation scheme determining circuit 14a, receiving circuit 15a, and demodulation circuit 16a) in the auxiliary storage unit 305 and loading the program into the main memory unit 302 to execute the program by the CPU 301.

While the invention has been particularly shown and described with reference to exemplary embodiments thereof, this invention is not limited to the above-mentioned embodiments. It will be understood by those of ordinary skilled in the art that various changes in form and derails may be made therein without departing from the sprit and scope of the present invention as defined by the claims.

This application is the National Phase of PCT/JP2009/051018, filed Jan. 16, 2009, which is based upon and claims the benefit of priority from Japanese Patent Application No. 2008-013584, filed on Jan. 24, 2008, the disclosure of which is incorporated herein in its entirety by reference.

The invention claimed is:

1. A radio transmission device having an automatic transmission power control function of controlling transmission power of its own station so as to maintain received power of a counter station at a preset constant value and a function of an adaptive modulation scheme for automatically switching over a modulation scheme depending on quality of a radio transmission path,
the radio transmission device comprising a modulation scheme determining circuit that switches over the modulation scheme by using the adaptive modulation scheme in consideration of a transmission power margin and the received power.

2. A radio transmission device according to claim 1, wherein:
the transmission power margin is a difference between a maximum transmission power that can be transmitted which has been received from the counter station and a current transmission power; and
the received power is an own station received power detected by the own station.

3. A radio transmission device according to claim 2, wherein the modulation scheme determining circuit switches over the modulation scheme if a predetermined switching condition is satisfied by: a result of comparing the own station received power with a preset modulation scheme switching threshold value; and a result of comparing the transmission power margin of the counter station in a current modulation scheme with a difference between the own station received power and the modulation scheme switching threshold value or with a difference between an automatic transmission power control threshold value for controlling the transmission power of the own station by using the automatic transmission power control and the modulation scheme switching threshold value.

4. A radio transmission device according to claim 3, wherein the modulation scheme determining circuit determines that the current modulation scheme is to be changed over to another modulation scheme if a state in which the switching condition is satisfied has continued for a time interval equal to or longer than a preset time interval.

5. A radio transmission device according to claim 3, wherein:
the modulation scheme determining circuit switches over the modulation scheme from a first modulation scheme exhibiting a small fluctuation immunity but a large transmission capacity to a second modulation scheme exhibiting a large fluctuation immunity but a small transmission capacity if the own station received power is smaller than the modulation scheme switching threshold value and if the transmission power margin is smaller than the difference between the own station received power and the modulation scheme switching threshold value; and the modulation scheme determining circuit switches over the modulation scheme from the second modulation scheme to the first modulation scheme if the own station received power is larger than the modulation scheme switching threshold value and if the transmission power margin is larger than the difference between the automatic transmission power control threshold value and the modulation scheme switching threshold value.

6. A radio transmission device according to claim 1, wherein:

the transmission power margin is a difference between a maximum transmission power that can be transmitted in a current modulation scheme of the own station and a current transmission power; and the received power is a counter station received power received from the counter station.

7. A radio transmission device according to claim 6, wherein the modulation scheme determining circuit switches over the modulation scheme if a predetermined switching condition is satisfied by: a result of comparing the counter station received power with a preset modulation scheme switching threshold value; and a result of comparing the transmission power margin of the own station in the current modulation scheme with a difference between the counter station received power and the modulation scheme switching threshold value or with a difference between an automatic transmission power control threshold value for controlling the transmission power of the own station by using the automatic transmission power control and the modulation scheme switching threshold value.

8. A radio transmission device according to claim 7, wherein the modulation scheme determining circuit determines that the current modulation scheme is to be changed over to another modulation scheme if a state in which the switching condition is satisfied has continued for a time interval equal to or longer than a preset time interval.

9. A radio transmission device according to claim 7, wherein:

the modulation scheme determining circuit switches over the modulation scheme from a first modulation scheme exhibiting a small fluctuation immunity but a large transmission capacity to a second modulation scheme exhibiting a large fluctuation immunity but a small transmission capacity if the counter station received power is smaller than the modulation scheme switching threshold value and if the transmission power margin is smaller than the difference between the counter station received power and the modulation scheme switching threshold value; and the modulation scheme determining circuit switches over the modulation scheme from the second modulation scheme to the first modulation scheme if the counter station received power is larger than the modulation scheme switching threshold value and if the transmission power margin is larger than the difference between the automatic transmission power control threshold value and the modulation scheme switching threshold value.

10. A method of determining a modulation scheme for a radio transmission device having an automatic transmission power control function of controlling transmission power of its own station so as to maintain received power of a counter station at a preset constant value and a function of an adaptive modulation scheme for automatically switching over a modulation scheme depending on quality of a radio transmission path, the method of determining a modulation scheme comprising switching over the modulation scheme by using the adaptive modulation scheme in consideration of a transmission power margin and the received power.

11. A method of determining a modulation scheme according to claim 10, wherein:

the transmission power margin is a difference between a maximum transmission power that can be transmitted which has been received from the counter station and a current transmission power; and the received power is an own station received power detected by the own station.

12. A method of determining a modulation scheme according to claim 11, wherein said method comprising:

comparing the own station received power with a preset modulation scheme switching threshold value;

comparing the transmission power margin of the counter station in the current modulation scheme with a difference between the own station received power and the modulation scheme switching threshold value or with a difference between an automatic transmission power control threshold value for controlling the transmission power of the own station by using the automatic transmission power control and the modulation scheme switching threshold value; and switching over the modulation scheme if a predetermined switching condition is satisfied by results of the comparing.

13. A method of determining a modulation scheme according to claim 12, said method further comprising determining that the current modulation scheme is to be changed over to another modulation scheme if a state in which the switching condition is satisfied has continued for a time interval equal to or longer than a preset time interval.

14. A method of determining a modulation scheme according to claim 12, wherein said switching comprising:

switching over the modulation scheme from a first modulation scheme exhibiting a small fluctuation immunity but a large transmission capacity to a second modulation scheme exhibiting a large fluctuation immunity but a small transmission capacity if the own station received power is smaller than the modulation scheme switching threshold value and if the transmission power margin is smaller than the difference between the own station received power and the modulation scheme switching threshold value; and switching over the modulation scheme from the second modulation scheme to the first modulation scheme if the own station received power is larger than the modulation scheme switching threshold value and if the transmission power margin is larger than the difference between the automatic transmission power control threshold value and the modulation scheme switching threshold value.

15. A method of determining a modulation scheme according to claim 10, wherein:

the transmission power margin is a difference between a maximum transmission power that can be transmitted in a current modulation scheme of the own station and a current transmission power; and the received power is a counter station received power received from the counter station.

16. A method of determining a modulation scheme according to claim 15, wherein said method comprising:
- comparing the own station received power with a preset modulation scheme switching threshold value;
- comparing the transmission power margin of the own station in the current modulation scheme with a difference between the own station received power and the modulation scheme switching threshold value or with a difference between an automatic transmission power control threshold value for controlling the transmission power of the own station by using the automatic transmission power control and the modulation scheme switching threshold value; and
- switching over the modulation scheme if a predetermined switching condition is satisfied by results of the comparing.

17. A method of determining a modulation scheme according to claim 16, said method further comprising determining that the current modulation scheme is to be changed over to another modulation scheme if a state in which the switching condition is satisfied has continued for a time interval equal to or longer than a preset time interval.

18. A method of determining a modulation scheme according to claim 16, wherein said switching comprising:
- switching over the modulation scheme from a first modulation scheme exhibiting a small fluctuation immunity but a large transmission capacity to a second modulation scheme exhibiting a large fluctuation immunity but a small transmission capacity if the counter station received power is smaller than the modulation scheme switching threshold value and if the transmission power margin is smaller than the difference between the counter station received power and the modulation scheme switching threshold value; and
- switching over the modulation scheme from the second modulation scheme to the first modulation scheme if the counter station received power is larger than the modulation scheme switching threshold value and if the transmission power margin is larger than the difference between the automatic transmission power control threshold value and the modulation scheme switching threshold value.

\* \* \* \* \*